United States Patent
Chiu

(10) Patent No.: US 7,561,029 B2
(45) Date of Patent: Jul. 14, 2009

(54) REMOTE CONTROLLER FOR AUTOMOBILE TRUNK

(76) Inventor: Pei-Cheng Chiu, 1F., No. 47, Chung Ching Rd., Tsuo Ying District, Kaohsiung City (TW)

( * ) Notice: Subject to any disclaimer, the term of this patent is extended or adjusted under 35 U.S.C. 154(b) by 316 days.

(21) Appl. No.: 11/380,426

(22) Filed: Apr. 27, 2006

(65) Prior Publication Data

US 2007/0252682 A1 Nov. 1, 2007

(51) Int. Cl.
*B60R 25/10* (2006.01)

(52) U.S. Cl. .......................... 340/426.13; 340/426.16; 340/426.17; 340/426.28; 340/426.29; 340/539.1; 340/825.69; 340/825.72

(58) Field of Classification Search ........... 340/426.13, 340/426.16, 426.29, 539.1, 539.11, 539.21, 340/539.23, 825.69, 825.72, 426.28, 5.61, 340/426.17; 307/10.2, 10.3; 341/176, 177; 455/116; 180/187, 185

See application file for complete search history.

(56) References Cited

U.S. PATENT DOCUMENTS

| | | | | |
|---|---|---|---|---|
| 4,663,626 A | * | 5/1987 | Smith | 340/825.69 |
| 5,278,547 A | * | 1/1994 | Suman et al. | 340/5.22 |
| 5,534,845 A | * | 7/1996 | Issa et al. | 340/425.5 |
| 5,648,764 A | * | 7/1997 | Nose et al. | 340/5.3 |
| 5,673,017 A | * | 9/1997 | Dery et al. | 340/426.17 |

* cited by examiner

*Primary Examiner*—Hung T. Nguyen
(74) *Attorney, Agent, or Firm*—Leong C. Lei

(57) ABSTRACT

A remote controller for automobile trunk is disclosed, wherein a frequency receiving host device is coupled to a device or component of an anti-burglary host device that is originally installed in an automobile by an automobile maker. The frequency receiving host device is connected by a cable to a driving motor for a trunk of the automobile and is set to receive the frequency of a user-operated remote-control transmitter originally provided by the automobile maker. The frequency receiving host device, after detecting a releasing operation initiated by a signal transmitted from the remote-control transmitter to the anti-burglary host device to release an anti-burglary system of the automobile, receives a continuously transmitted signal from the remote-control transmitter, which signal extends for a predetermined period of time, and consequently the frequency receiving host device issues a control signal through the cable to the trunk driving motor to open the trunk lid. With such an arrangement, even a low-end automobile can have the same advanced remote-control feature as that incorporated in a high-end automobile.

1 Claim, 2 Drawing Sheets

REMOTE CONTROLLER FOR AUTOMOBILE TRUNK

BACKGROUND OF THE INVENTION (a) Technical Field of the Invention

The present invention relates to a remote controller for a trunk of an automobile, and in particular to a device for opening the automobile trunk with the original automobile remote control system of the automobile available from the automobile makers.

(b) Description of the Prior Art

Currently, an automobile, especially a passenger car, is often provided with a remote controller, which also operates an automobile security or anti-burglary control system that is originally installed in the automobile by the automobile makers. An example of the automobile anti-burglary control system is shown in FIG. 1 of the attached drawings and designated with reference numeral 1. The anti-burglary control system 1 comprises a remote-control transmitter to be carried by a user or driver of the automobile, and an anti-burglary host device 12 installed in the automobile. The anti-burglary host device 12 is coupled to security or anti-burglary facility of the automobile, including a central door control lock 121, an ignition system 122, and a fuel supply system 123, but not limited thereto.

When a user is located within an effective distance of the anti-burglary host device 12, the user may actuate the remote-control transmitter 11 to release the anti-burglary system whereby the central door control lock 121 is released, and the ignition system 122 and the fuel supply system 123 are put in a standby condition. The user may now use a key of the automobile to start the automobile engine. On the other hand, when the driver is leaving the automobile, the user may actuate the remote-control transmitter 11 to set the anti-burglary system of the automobile, whereby the central door control lock 121 is secured, and the ignition system 122 and the fuel supply system 123 are shut off. Thus, electricity and fuel cannot be supplied to the engine and starting the engine becomes impossible. This protects the automobile from unauthorized operation.

Referring to FIG. 2, in a high-end automobile that is often much more expensive and equipped with advanced devices, an anti-burglary system 2 comprises an anti-burglary host device 22, which is further connected to a driving motor 23 for a trunk of the automobile. When a user continuously depresses an actuation button of the remote-control transmitter 21 for an extended time period, the anti-burglary host device 22 issues a control signal to the trunk driving motor 23 by which signal the trunk driving motor 23 operates through a control cable to open a lid of the trunk.

Such an advanced anti-burglary system, however, is usually not equipped in a low-end automobile. The low-end automobile anti-burglary system, such as the anti-burglary 1 shown in FIG. 1, cannot open the trunk lid with the operation of the remote-control transmitter. Thus, it is desired to incorporate the featuring of opening trunk lid in a remote-controlled manner in a low-end automobile without substantial modification or causing any damage to the original facility provided in the low-end automobile by the automobile maker.

SUMMARY OF THE INVENTION

The primary purpose of the present invention is to provide a remote controller for automobile trunk, wherein a frequency receiving host device is provided and coupled to a device or component of an anti-burglary host device that is originally installed in an automobile by an automobile maker. The frequency receiving host device is connected by a cable to a driving motor for a trunk of the automobile. The frequency receiving host device, after detecting a releasing operation initiated by a signal transmitted from a user-operated remote-control transmitter to the anti-burglary host device to release an anti-burglary system of the automobile, receives a continuously transmitted signal from the remote-control transmitter, which signal extends for a predetermined period of time, and consequently the frequency receiving host device issues a control signal through the cable to the trunk driving motor to open the trunk lid. With such an arrangement, even a low-end automobile can have the same advanced remote-control feature as that incorporated in a high-end automobile, without substantial modification of the original system.

The foregoing object and summary provide only a brief introduction to the present invention. To fully appreciate these and other objects of the present invention as well as the invention itself, all of which will become apparent to those skilled in the art, the following detailed description of the invention and the claims should be read in conjunction with the accompanying drawings. Throughout the specification and drawings identical reference numerals refer to identical or similar parts.

Many other advantages and features of the present invention will become manifest to those versed in the art upon making reference to the detailed description and the accompanying sheets of drawings in which a preferred structural embodiment incorporating the principles of the present invention is shown by way of illustrative example.

BRIEF DESCRIPTION OF THE DRAWINGS

The present invention will be apparent to those skilled in the art by reading the following description of a preferred embodiment of the invention, with reference to the attached drawings, in which.

DETAILED DESCRIPTION OF THE PREFERRED EMBODIMENTS

The following descriptions are of exemplary embodiments only, and are not intended to limit the scope, applicability or configuration of the invention in any way. Rather, the following description provides a convenient illustration for implementing exemplary embodiments of the invention. Various changes to the described embodiments may be made in the function and arrangement of the elements described without departing from the scope of the invention as set forth in the appended claims.

Figure 1:
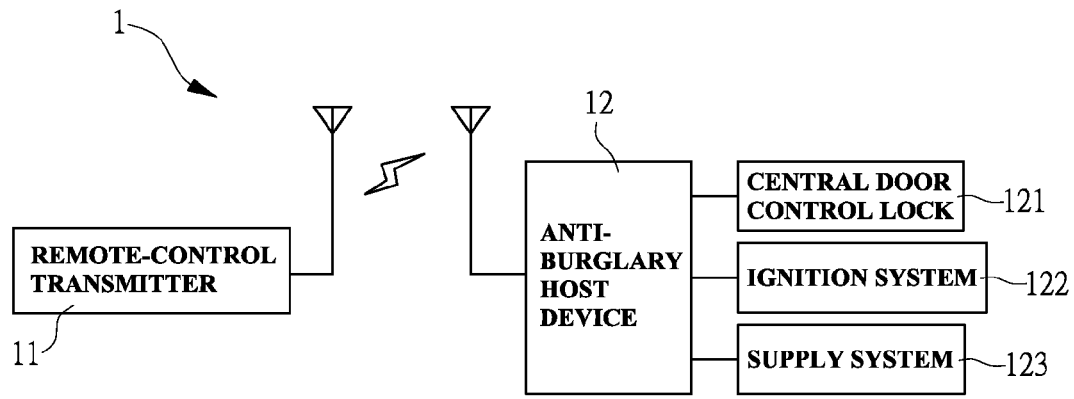
FIG. 1 is a block diagram showing a conventional automobile anti-burglary system.
Figure 2:
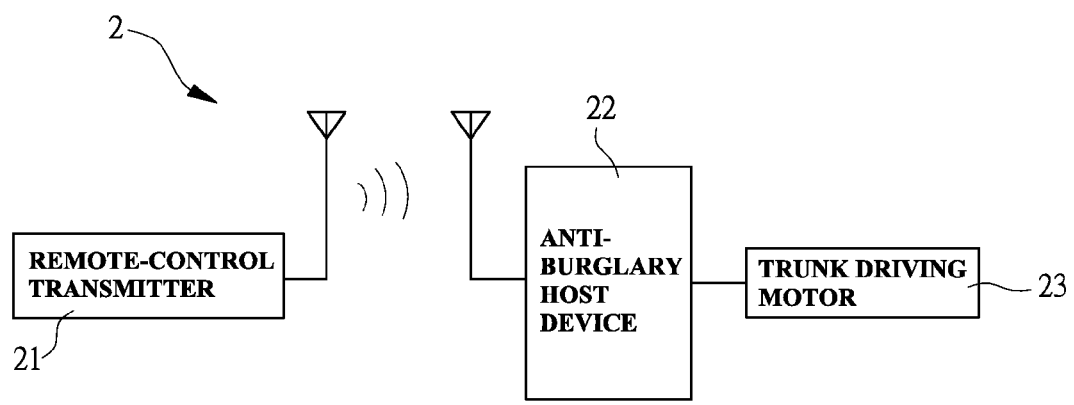
FIG. 2 is a block diagram showing another conventional automobile anti-burglary system.
Figure 3:
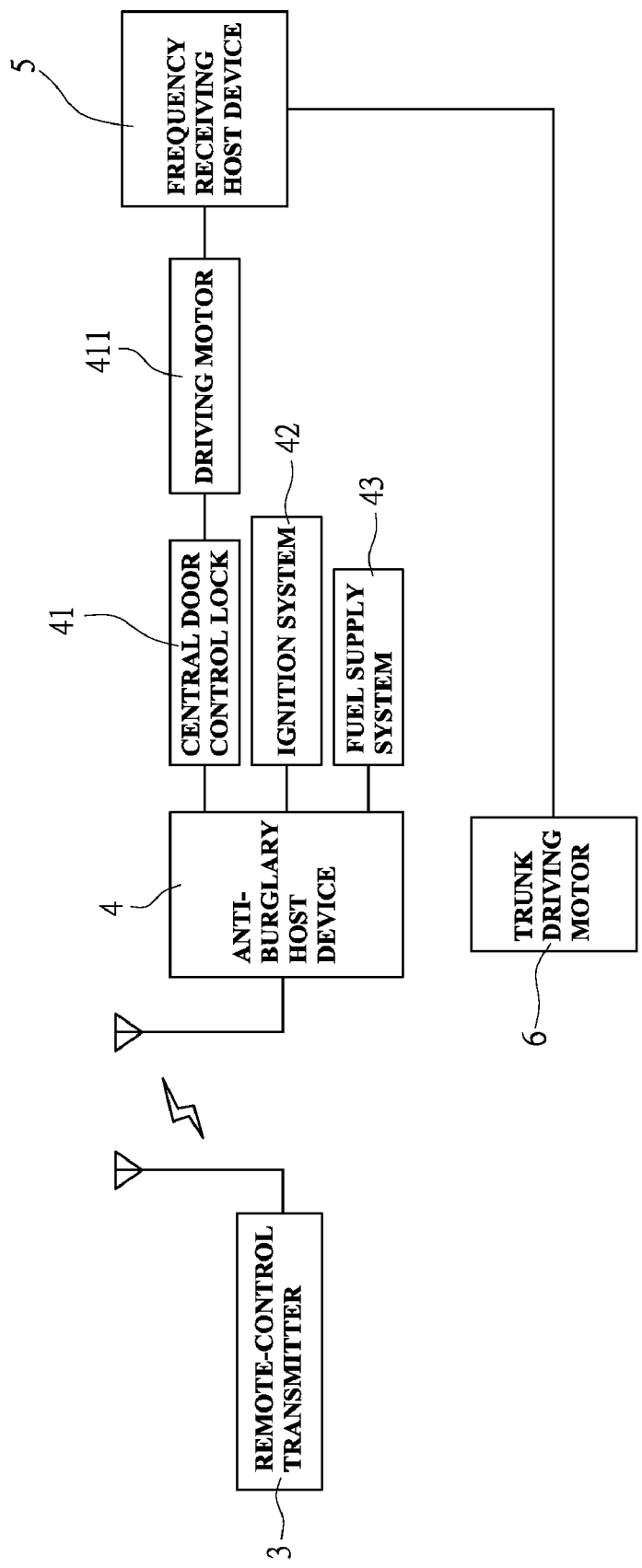
FIG. 3 is a block diagram showing a remote controller for automobile trunk constructed in accordance with the present invention.

With reference to the drawings and in particular to FIG. 3, a remote controller for automobile trunk constructed in accordance with the present invention comprises a remote-control transmitter 3, an anti-burglary host device 4 and a frequency receiving host device 5. The anti-burglary host device 4 and the remote-control transmitter 3 may selectively constitute a portion of an anti-burglary system that is originally installed in an automobile that is available in the market. Alternatively, the anti-burglary host device 4 and the remote-control transmitter 3 may constitute an additional system to an automobile that is available from the market.

The remote-control transmitter 3 is portable by a user or a driver of the automobile. The remote-control transmitter 3 selectively transmits a wireless signal to the anti-burglary host device 4. The signal can be enciphered.

The anti-burglary host device 4 is coupled to anti-burglary control facility that is originally arranged in the automobile, such as a central door control lock 41, an ignition system 42, and a fuel supply system 43. The anti-burglary host device 4 can receive the wireless signal from the remote-control transmitter 3 to selectively set and release the anti-burglary control facility.

In accordance with the present invention, the frequency receiving host device 5 is set to receive the frequency of the wireless signal transmitted from the remote-control transmitter 3. The frequency receiving host device 5 is connected to any device or component of the anti-burglary control facility to which the anti-burglary host device 4 is coupled and can detect the releasing operation of the anti-burglary control facility. Further, the frequency receiving host device 5 is connected by a signal cable (not shown) to a driving motor 6 arranged in the trunk of the automobile. Alternatively, the frequency receiving host device 5 can be individually installed inside the automobile, or in combination with additional device, such as back-up detection radar, automatic closing system of side mirrors, and hands-free mobile phone system.

As mentioned above, the frequency receiving host device 5 is connected to any device or component of the anti-burglary facility, of which an example is a driving motor 411 of the central door control lock 41. It is apparent that the frequency receiving host device 5 can also be connected to other device, which is a design choice to those having ordinary skills in the art. When a user or driver of the automobile approaches the automobile in which the present invention is embodied to a predetermined effective distance for transmission of the wireless signal, the user may actuates the remote-control transmitter 3 by for example depressing an actuation button, to emit a signal for setting or releasing the anti-burglary facility of the anti-burglary host device 4. This maintains the original anti-burglary function of the anti-burglary control facility installed in the automobile.

When the driver wishes to open the trunk, the driver continuously depresses the remote-control transmitter 3 for a predetermined period of time, for example and preferably 2 to 5 seconds, which makes the transmitter 3 continuously emit the wireless signal. The anti-burglary host device 4, when initially receiving the wireless signal, commands the driving motor 411 of the central door control lock 4 to release door lock. Then, the frequency receiving host device 5 detects the door lock releasing initiated by the driving motor 411 of the central door control lock 4 and further continuously receives the wireless signal extending for the predetermined time period. The frequency receiving host device 5 consequently outputs a signal to the trunk driving motor 6, which then operates on a control cable of the trunk to open the trunk lid.

To summarize, in the present invention, a frequency receiving host device 5 is coupled to a device or component of the anti-burglary system incorporating the anti-burglary host device 4, and the frequency receiving host device 5 is connected by a cable to the trunk driving motor 6. When the frequency receiving host device 5 receives an extended signal that lasting for the predetermined period of time and the anti-burglary host device 4 is released, the frequency receiving host device 5 issues the control signal to the trunk driving motor 6 to open the trunk lid. Apparently, it is easy to practice the present invention by simply setting the operation frequency of the frequency receiving host device 5 to the frequency of the remote-control transmitter that can be originally provided by the automobile makers. No decoding of the remote-control transmitter is needed. This allows the low-end automobile to be provided with additional function that is generally available for high-end automobiles only. In other words, the low-end automobiles are also available with automatic trunk opening.

Although the present invention has been described with reference to what is believed to be the preferred embodiments of the present invention, it is may be made without departing from the scope of the present invention which is intended to be defined by the appended claims It will be understood that each of the elements described above, or two or more together may also find a useful application in other types of methods differing from the type described above.

While certain novel features of this invention have been shown and described and are pointed out in the annexed claim, it is not intended to be limited to the details above, since it will be understood that various omissions, modifications, substitutions and changes in the forms and details of the device illustrated and in its operation can be made by those skilled in the art without departing in any way from the spirit of the present invention.

I claim:

1. In a remote controlling device for a trunk of an automobile, said remote controlling device comprising a remote-control transmitter which selectively transmits a wireless signal, an anti-burglary host device which is coupled to anti-burglary control facility installed in said automobile and selectively releases said anti-burglary control facility by receiving said wireless signal, said anti-burglary control facility containing a central door control lock, an ignition system and a fuel supply system, said central door control lock having a driving motor, the improvement wherein a frequency receiving host device is coupled to said anti-burglary control facility and set to receive frequency of said wireless signal and detect releasing operation of said anti-burglary control facility, said frequency receiving host device being connected to a trunk driving motor, said frequency receiving host device being further connected to said driving motor of said central door control lock, wherein when said remote-control transmitter is depressed to emit a wireless signal, said anti-burglary host device will command said driving motor of said central door control lock to release a door lock, and when said remote-control transmitter is continuously depressed to emit said wireless signal continuously for a predetermined period of time, said frequency receiving host device will detect release of said door lock and further continuously receives said wireless signal extending for said predetermined period of time thereby outputting a signal to said trunk driving motor to open a lid of said trunk.

* * * * *